L. A. BRUMLEY.
FERTILIZER DISTRIBUTER.
APPLICATION FILED MAR. 24, 1916.

1,213,737.

Patented Jan. 23, 1917.
2 SHEETS—SHEET 1.

Inventor
Lester A. Brumley
By Edwin S. Clarkson
his Attorney

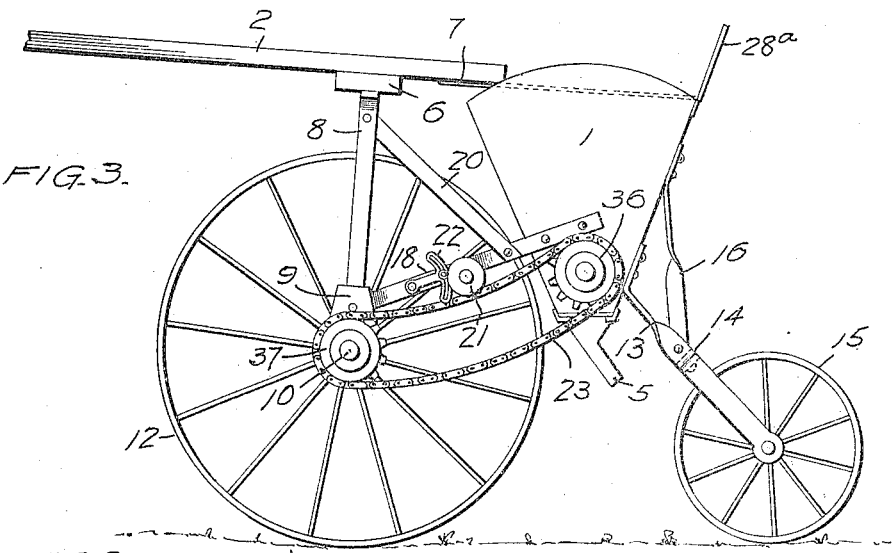

UNITED STATES PATENT OFFICE.

LESTER A. BRUMLEY, OF SANFORD, FLORIDA.

FERTILIZER-DISTRIBUTER.

1,213,737.　　　　Specification of Letters Patent.　　Patented Jan. 23, 1917.

Application filed March 24, 1916. Serial No. 86,408.

*To all whom it may concern:*

Be it known that I, LESTER A. BRUMLEY, a citizen of the United States of America, residing at Sanford, in the county of Seminole and State of Florida, have invented certain new and useful Improvements in Fertilizer-Distributers, of which the following is a specification.

The object of my invention is to provide a fertilizer distributer of such construction that the amount of fertilizer distributed may be controlled by the operator.

A further object of my invention is to mount the wheels of the machine within the plane of the sides of the machine.

A further object of my invention is to so mount the front wheels of the machine that they may be adjusted toward or from each other so that the distance between them may be varied to enable them to straddle various sizes of rows of growing plants.

A still further object of my invention is to provide a fertilizer distributer of a construction which is efficient in use, durable and cheap to manufacture; and with these and other objects in view my invention consists of the parts and combination of parts as will be hereinafter pointed out.

Figure 1:
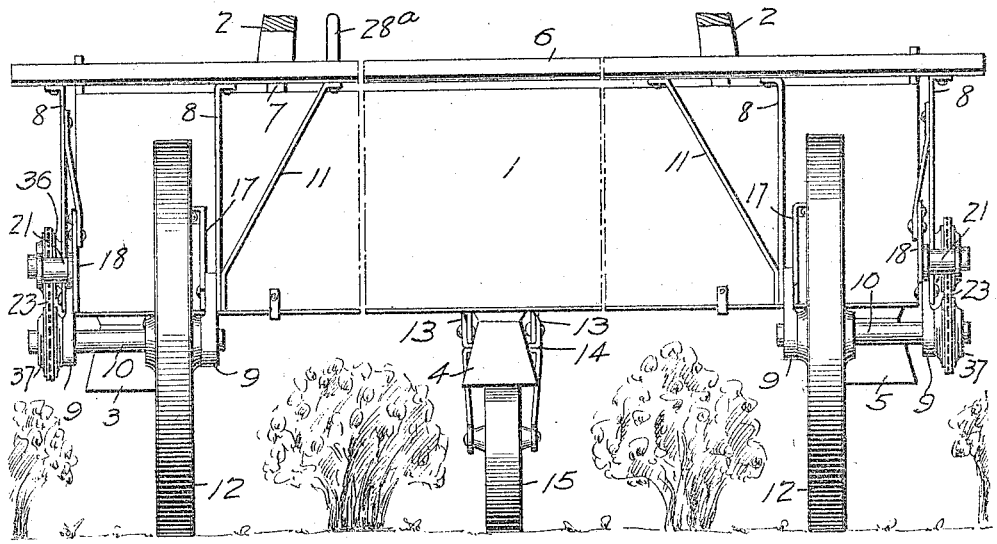
Figure 2:
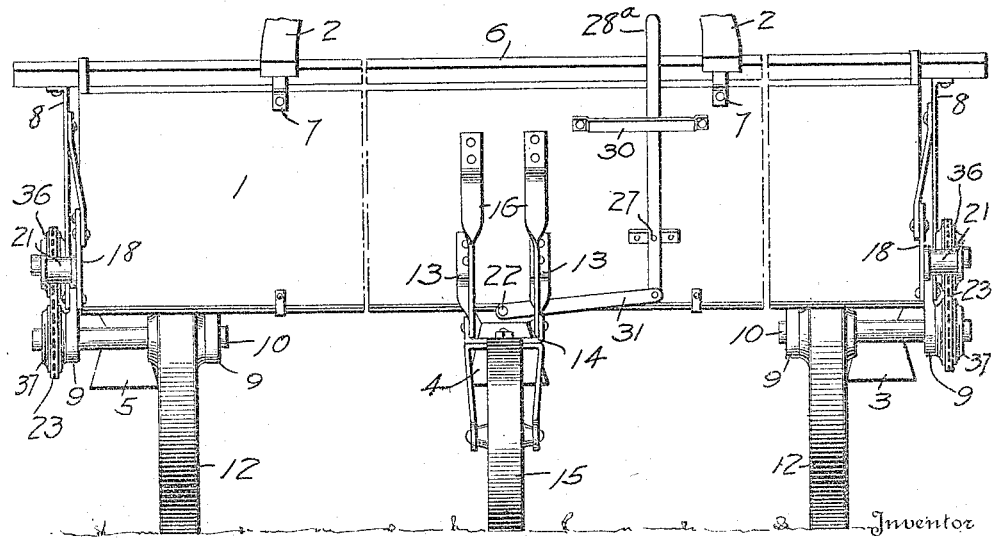

In the drawings: Figure 1 is a front elevation of a fertilizer distributer embodying by invention. Fig. 2 is a rear elevation of the same. Fig. 3 is a side elevation of Fig. 1. Fig. 4 is a top plan view of my improved machine. Fig. 5 is a detail vertical sectional view through the fertilizer box. Fig. 6 is a top plan view of the broad cast plate. Fig. 7 is a top plan view of a gage plate for distributing fertilizer to three rows of plants. Fig. 8 is a top plan view of another gage plate.

The body of the machine, which is designated by the reference numeral 1, constitutes the holder for the fertilizer and may be of any desired shape, but I prefer that its front and rear walls converge at the bottom so that the body is in effect, funnel shape, as clearly shown in Figs. 3 and 5. The shafts 2 project forwardly from the machine.

Leading from the bottom of the body or fertilizer box or container are three distributing nozzles or funnels 3, 4, and 5. The nozzles 3 and 5 being positioned at or near the ends of the container 1 while the nozzle 4 is positioned at the center of the container. This arrangement adapts the machine to distribute the fertilizer to one side of the rows or plants immediately beyond the ends of the container 1 and both sides of two rows of plants located, respectively, between the nozzles 3 and 4 and 4 and 5, as shown in Fig. 1. As will be hereinafter described the machine may be operated as a broad cast distributer.

A cross piece 6 connects the shafts 2 in front of the container 1 and straps 7 extend from the rear end of the shafts to the back of the container. Bracket arms or pedestals 8 are secured to the cross piece 6 and depend therefrom, in pairs; the pedestals of each pair being spaced comparatively wide apart, as shown in Fig. 1. The lower ends of these pedestals carry journal boxes 9 in which the axles or journals 10 are mounted at each end. Suitable braces 11 extend from the pedestals 8 to the cross pieces 6.

Traction wheels 12 are mounted on and suitably keyed to the axles 10 in such manner that they may be moved longitudinally of the axles whereby they may be adjusted relatively to each other to adapt them to fit various size rows of plants varying, for instance, from twenty-four to thirty-four inches. The machine sets over two rows of plants while the traction wheels run between these rows and two other rows of plants. At the rear of the machine I secure a bracket 13 to the container which has a broad bearing surface 14 to which the caster 15 is swiveled. Suitable braces 16 extend between the bracket 13 and the container 1.

The pedestals are connected to the container 1 by means of braces 17 and 18, one end of the braces 18 being secured to the end walls of the container. A flat rod 20 connects the top of the pedestal to the brace 18. An idler wheel 21 is mounted on a bracket 22 which latter is adjustably mounted on the brace 18, whereby the slack in a drive chain 23 may be taken up. The bottom of the container 1 terminates in a restricted opening which is covered by means of the broad cast plate 24 secured to the bottom of the box by means of screws, nails, or the like, which pass through the openings 25. This broad cast distributer plate 24 is provided throughout its length with a series of openings 26. A gage plate 27 having a tooth like edge 28 is slidably mounted above the plate 24. The teeth of said plate being adapted to control the size of the passageway for the fertilizer through the openings 26 of the plate 24 so that the amount of fertilizer per acre may be governed.

A hand lever 28ª is pivoted at 29 to the container. A ratchet bar 30 is also secured to the container by means of which the lever 28ª is locked in an adjusted position, the lever 28ª being provided with a suitable dog to coöperate with said ratchet. A link 31 is pivotally connected with the lower end of the hand lever 28ª at one end and at its other end is connected to the gage plate 27 by means of a knuckle or other suitable joint 32, whereby the gage bar or plate 27 may be moved longitudinally relatively to the broad cast plate 24 and thus regulate the amount of fertilizer distributed.

When the machine is used to fertilize rows of plants, I use the plate 33 which is provided with three openings 34 for fertilizer to pass through. The toothed edge 28 of the gage bar 27 also registers with and controls the size of the passageway through the openings 34 and this controls the amount of fertilizer for each row of plants. All of the plates 24, 27, and 33 work under the container and form a bottom therefor. The container may be provided with any suitable agitator 35 to facilitate the flow of the fertilizer and this agitator is operated by means of sprocket wheels 36 on the end of its shaft which in turn are operated by means of the chain 23, which in turn is operated by means of sprocket wheels 37 keyed to the shafts 10.

Among the advantages of this machine may be stated, the fact that the machine fertilizes two complete rows and the half of two other rows of plants in one passage across a field and the work is accomplished without any effort at all on the part of the operator, except that of walking behind the machine and operate the gage plate 27 at the ends of the rows when the machine is being turned around to prevent waste of fertilizer. The front wheels are positioned in front of the container, and travel between the rows of plants. The advantages of having the front wheels so positioned is that the machine may be driven close to a fence, inasmuch as there is no projection beyond the ends of the container. This arrangement of wheels dispenses with the usual projecting wheel axle on each side of the machine whereby I am enabled to materially reduce the overall width of the machine without reducing its efficiency. A sheet iron casing may be placed over the sprocket wheel 36, sprocket wheel 37 and chain 23 if desired.

What I claim is:—

In a fertilizer distributer, the combination with a fertilizer container, of pedestals secured therewith in pairs near each end thereof, brackets extending between and connected to said pedestals and container, braces extending between and connected to said pedestals and brackets, a stub axle journaled in each of said pairs of pedestals, traction wheels keyed to but slidably mounted on said axles, said wheels being permanently within the vertical plane of the end walls of the container and means operated by the traction wheels for feeding material in the container.

In testimony whereof I affix my signature in the presence of two witnesses.

LESTER A. BRUMLEY.

Witnesses:
SCHELLE MAINES,
F. H. HARRIS.

Copies of this patent may be obtained for five cents each, by addressing the "Commissioner of Patents Washington, D. C."